United States Patent [19]
Grooss

[11] 3,726,540
[45] Apr. 10, 1973

[54] TANDEM AXLE SUSPENSION SYSTEM FOR HEAVY-DUTY VEHICLE

[75] Inventor: Frank A. Grooss, Morton, Ill.

[73] Assignee: Caterpillar Tractor Co., Peoria, Ill.

[22] Filed: June 11, 1971

[21] Appl. No.: 152,288

[52] U.S. Cl. ..........................280/104.5 A, 180/73 R
[51] Int. Cl. ................................................B60g 5/06
[58] Field of Search ....:............280/104.5 A, 104.5 R; 180/73

[56] References Cited

UNITED STATES PATENTS 2,874,973  2/1959  Botkin..........................280/104.5 A
3,155,397  11/1964  Stump........................280/104.5 R X

*Primary Examiner*—Philip Goodman
*Attorney*—Fryer, Tjensvold, Feix, Phillips & Lempio

[57] ABSTRACT

A vehicle suspension system includes tandem axles. Each axle is connected to the vehicle frame by an A-frame. An equalizer beam on each side of the vehicle connects adjacent ends of the tandem axles. Radius arms stabilize each axle in side thrust. All joints are spherical for universal action. All drive and braking torques and thrusts are taken by the ball joints at the apexes of the A-frames. Vertical loads on the wheels are equalized by equalizer beams, and the connections between the equalizer beams and the axles take vertical loads only without any torque reaction or alignment duties.

6 Claims, 3 Drawing Figures

INVENTOR
FRANK A. GROOSS

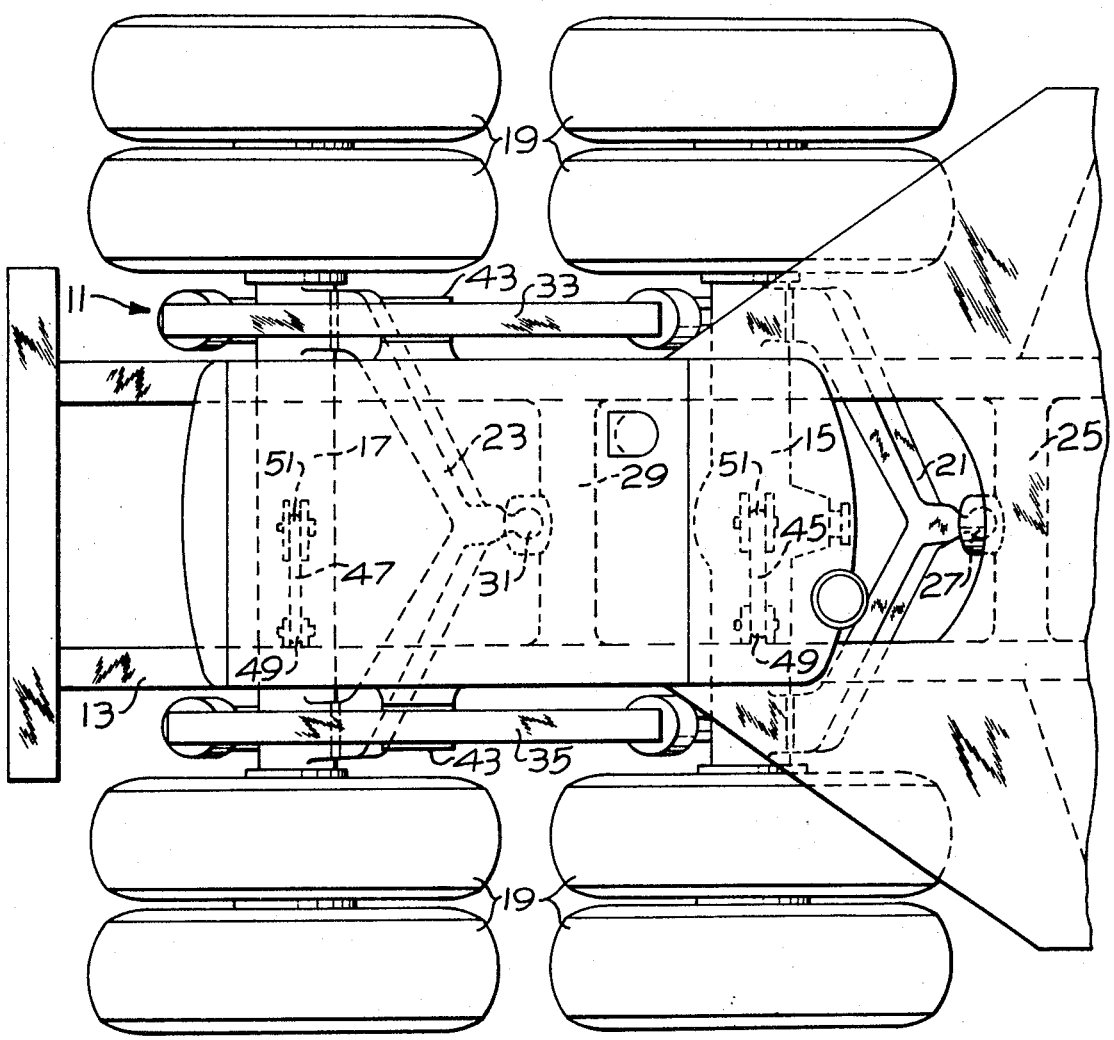

TANDEM AXLE SUSPENSION SYSTEM FOR HEAVY-DUTY VEHICLE

This invention relates to a suspension system for a vehicle.

This invention relates particularly to a tandem axle suspension system for a heavy-duty vehicle. Past experience with large capacity transport vehicles has shown that maximum mobility is important. It is desirable that suspension systems for such vehicles provide equalization or sharing of dynamic loads. Roll stability and good ride characteristics are also desirable.

It is an object of the present invention to construct a suspension system which is a simple structure having a minimum number of parts.

It is a specific object to construct a suspension system which has a minimum number of wear parts. All of the wear parts are ball joints.

It is a further specific object of the present invention to equalize all vertical loads on the wheels by equalizer beams and A-frames.

It is a further specific object of this invention to take all drive and braking torques and thrusts by a ball joint at the apex of an A-frame associated with each axle.

It is a further specific object of the present invention to stabilize the axles in side thrust by the radius arms so that there are no thrust loads on the equalizer beams or suspension means.

Air-oil struts may be used to cushion axle-to-chassis movement, and it is a further specific object of the present invention to construct the suspension system so that the strut connections between the equalizer beams and the axles (or any other connection between the equalizer beams and the axles) take a vertical load only and do not have any torque reaction or alignment duties.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a view taken from the rear of the suspension system;

FIG. 3 is a top plan view of the suspension system shown in FIGS. 1 and 2.

Figure 1:
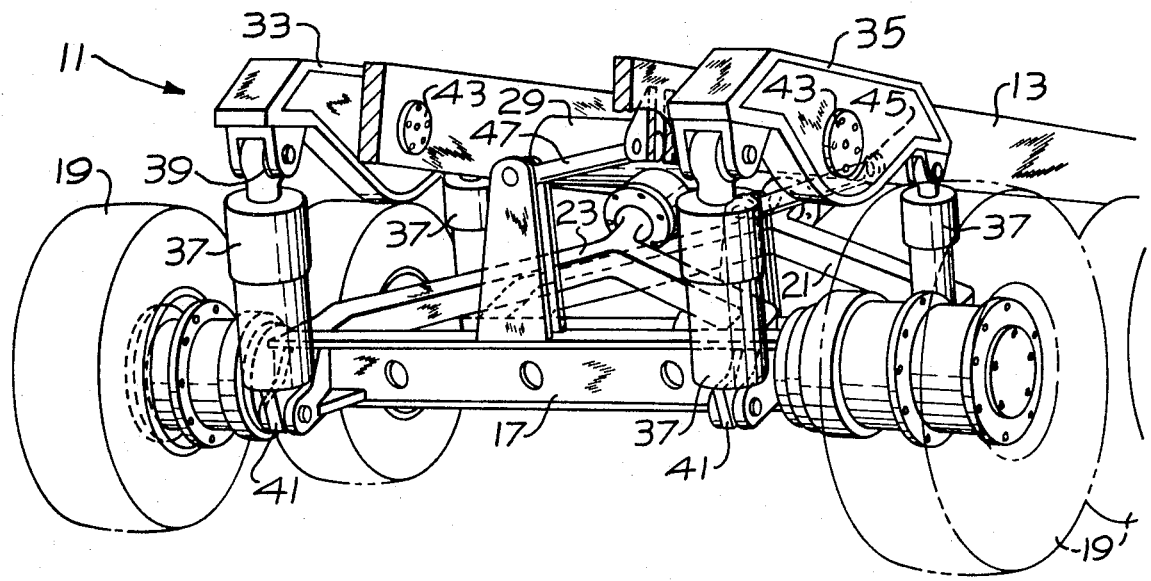
FIG. 1 is a perspective view of a suspension constructed in accordance with one embodiment of the present invention.
Figure 2:
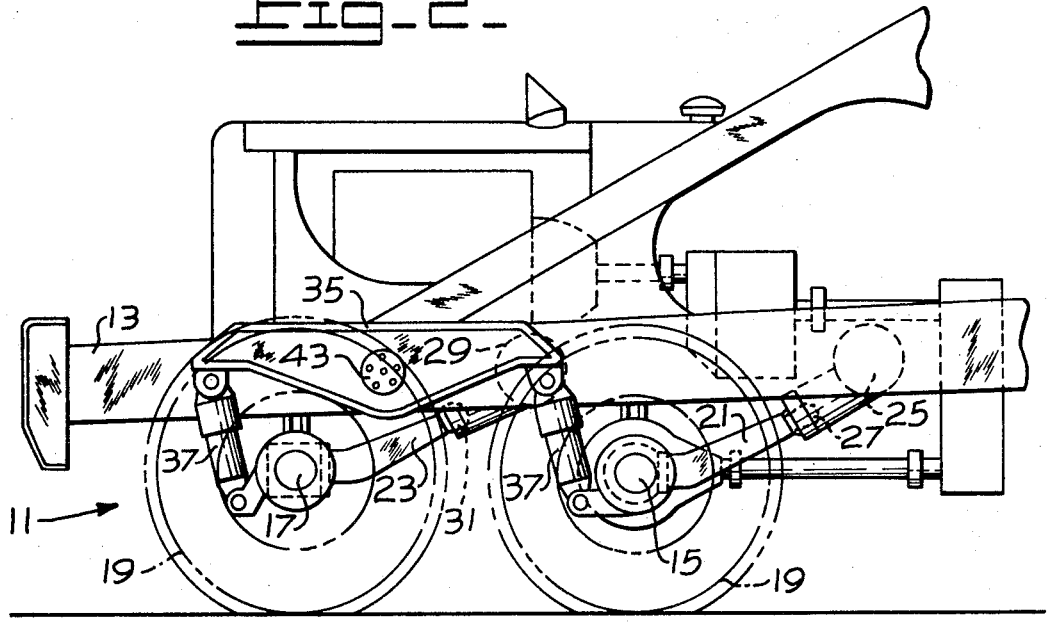
FIG. 2 is a side elevation view of the suspension system shown in FIG. 1.

A suspension system constructed in accordance with one embodiment of the present invention is indicated generally by the reference numeral 11 in FIGS. 1, 2 and 3.

The suspension system includes a vehicle frame 13.

A first axle 15 and a second axle 17 are disposed in tandem beneath the vehicle frame 13. As shown in the drawings, the first axle 15 is a live or driven axle, and the second axle 17 is a dead or nondriven axle. However, both axles may be live axles, or both axles may be dead axles, or the axle 17 may be a live axle and the axle 15 may be a dead axle.

Wheels 19 are mounted at the ends of the axles 15 and 17. In the particular embodiment illustrated in the drawings the wheels 19 are dual wheels. The inside wheels have been omitted in the FIG. 1 showing to improve the clarity of the illustration.

Suitable brakes, either disc or drum, are associated with the wheels and axles.

A first A-frame or wishbone 21 is associated with the first axle 15.

A second A-frame or wishbone 23 is associated with the second axle 17.

The apex of the A-frame 21 is connected to the central part of a cross member 25 of the vehicle frame in a ball joint connection 27.

The apex of the A-frame 23 is connected to the central part of a cross member 29 of the vehicle frame in a ball joint connection 31.

The ends of the A-frame 21 are welded or otherwise suitably rigidly attached to the ends of the axle 15.

The ends of the A-frame 23 are welded or otherwise suitably rigidly attached to the ends of the axle 17.

A rigid equalizer beam 33 extends between the adjacent ends of the axle 15 and the axle 17 on one side of the vehicle.

A rigid equalizer beam 35 extends between adjacent ends of the axle 15 and the axle 17 on the other side of the vehicle.

The ends of the equalizer beams are connected to the associated ends of the axles.

As shown in the drawings illustrating one embodiment of the present invention, the connections are by means of air-oil struts 37.

As illustrated in FIG. 1 on the left rear strut each upper end of each of the struts is connected in a spherical or ball joint connection 39 to a pin extending through downwardly extending lugs on the end of the equalizer beam.

Each lower end of each strut is connected in a spherical or ball joint connection 41 to a pin extending through lugs or ears on the axles.

The mid-part of each equalizer beam is pivotally connected to the vehicle frame 13 by a trunnion mount 43.

This trunnion mount is also a spherical joint construction.

The axle 15 is stabilized in side thrust by a cross link (radius arm) compression tension member 45.

The axle 17 is stabilized in side thrust by a cross link (radius arm) compression tension number 47.

Each radius arm is connected to a pin extending through lugs on the vehicle frame by a ball joint connection 49.

Each radius arm is connected to a pin extending through upwardly projecting lugs on the mid-part of the axle by a ball joint connection 51.

It should be noted, as will be described in greater detail below, that although air-oil struts 37 have been illustrated in the suspension system 11, different kinds of connections between the ends of the equalizer beams and the axles can be used while retaining many of the advantages of the present invention. For example, this connection could be made through a rubber block rather than through a pneumatic strut, and most of the advantages of the present invention would still be retained. There would however, be some loss of cushioning.

The tandem axle construction of the present invention provides a number of advantages.

It is a simple structure with a minimum number of parts.

The structure has a minimum number of wear parts. All of the wear parts are ball joints and can be lubricated for maximum wear life.

The suspension system combines the ride qualities of tandem axles to reduce axle movement transmitted to the vehicle by one half. The system also incorporates air-oil suspension struts to further reduce the axle movement transmitted to the vehicle and to cushion axle-to-chassis movement.

Because of the way in which the system is constructed and the way in which the components interact, the struts or other connections between the equalizer beams and the axles take axial load only. These connections take no side thrust.

All drive and braking torques and thrusts are taken by the ball joints at the apexes of the A-frames.

The system may be constructed so that the vertical loads are carried one-fourth on the ball joint at the apex of the A-frame and three-fourths on the struts.

The vertical loads on the wheels are equalized by the equalizer beams.

The axles are stabilized in side thrust by the radius arms. There are no side thrust loads on the equalizer beams.

There is no transmittal of stain or twist from one member to another. All loads are simple axial loads.

The equalizer beams transfer load from the vehicle equally between the two axles, causing an equal sharing of the load.

In addition to the equal load sharing, the combination of the strut and equalizer beam gives an excellent ride. The equalizer beams walk over large obstacles and divide their magnitude in half. The air-oil struts absorb small irregularities and provide damping. The air-oil struts take load only. The struts have no torque reaction or alignment duties.

The spherical joint connection on all members in contact permits universal action.

While the vehicle suspension has been illustrated with respect to one set of tandem axles, the same suspension may be used in units to provide the suspension advantages at each end of the vehicle. Thus, in one actual embodiment of the present invention a heavy-duty vehicle having a hauler body has a vehicle suspension system 11 at one end of the hauler body and a similar vehicle suspension system at the other end of the hauler body.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A suspension for a vehicle comprising, a vehicle frame, first and second axles in tandem beneath the vehicle frame, wheels at the ends of the axles, a first A-frame associated with the first axle, a second A-frame associated with the second axle, first and second ball joints connecting the apexes of the first and second A-frames to the vehicle frame, a rigid connection between each end of each A-frame and the associated end of its axle, a rigid equalizer beam extending between adjacent ends of the first and second axles at each side of the vehicle, shock absorbing connecting means for connecting each of the ends of the equalizer beams with an associated end of an axle, said connecting means supporting axial loads only and a pivotal connection between the mid-part of each equalizer beam and the vehicle frame whereby the loads on the wheels are equalized by the equalizer beams and all drive and braking torques are taken by the ball joints at the apexes of the A-frame.

2. A suspension as defined in claim 1 wherein at least one of the axles is a drive axle.

3. A suspension as defined in claim 1 wherein the shock absorbing connecting means are air-oil struts connected between the end of the equalizer beam and the end of the axle to take an axial load only without taking any side thrust.

4. A suspension as defined in claim 1 wherein each axle is stabilized against side thrusts by a radius arm pivotally connected at opposite ends to the vehicle frame and the axle.

5. A suspension as defined in claim 1 wherein all connections of the suspension have a spherical joint construction for universal action.

6. A vehicle suspension for a heavy-duty vehicle having a hauler body and comprising a vehicle frame and first and second suspension units beneath the vehicle frame at opposite ends of the hauler body, each suspension unit comprising, first and second axles in tandem beneath the vehicle frame, wheels at the ends of the axles, a first A-frame associated with the first axle, a second A-frame associated with the second axle, first and second ball joints connecting the apexes of the first and second A-frames to the vehicle frame, a rigid connection between each end of each A-frame and the associated end of its axle, a rigid equalizer beam extending between adjacent ends of the first and second axles at each side of the vehicle, shock absorbing connecting means connecting each of the ends of the equalizer beams with an associated end of an axle, said connecting means supporting axial loads only and a pivotal connection between the mid-part of each equalizer beam and the vehicle frame whereby the loads on the wheels are equalized by the equalizer beams and all drive and braking torques are taken by the ball joints at the apexes of the A-frame.

* * * * *